B. STECHBART.
FRAMING MEANS FOR MOTION PICTURE MACHINES.
APPLICATION FILED MAY 7, 1917. RENEWED AUG. 8, 1918.

1,287,504.

Patented Dec. 10, 1918.
2 SHEETS—SHEET 1.

Witness:
John Enders

Inventor:
Bruno Stechbart
by Robert Burns,
Atty

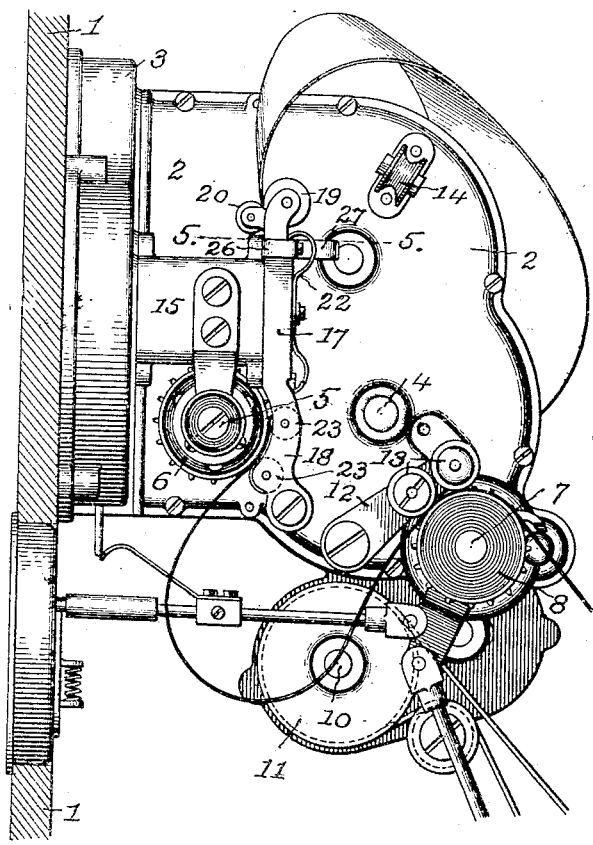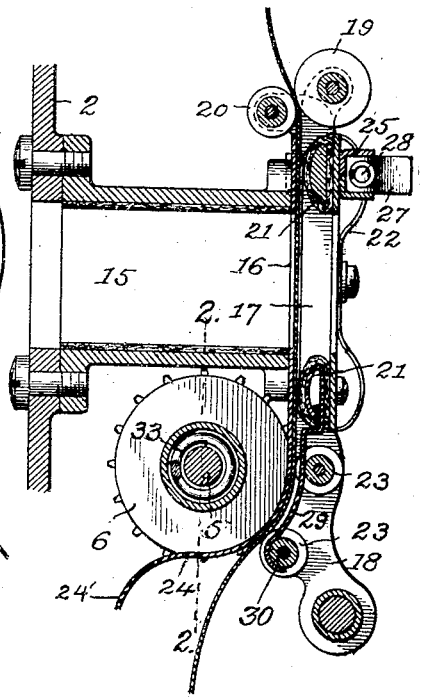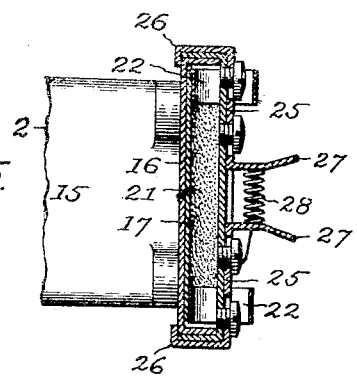

UNITED STATES PATENT OFFICE.

BRUNO STECHBART, OF CHICAGO, ILLINOIS, ASSIGNOR, BY MESNE ASSIGNMENTS, TO AMERICAN PROJECTING COMPANY, OF CHICAGO, ILLINOIS, A CORPORATION OF DELAWARE.

FRAMING MEANS FOR MOTION-PICTURE MACHINES.

1,287,504.     Specification of Letters Patent.     Patented Dec. 10, 1918.

Application filed May 7, 1917, Serial No. 166,867. Renewed August 3, 1918. Serial No. 248,964.

*To all whom it may concern:*

Be it known that I, BRUNO STECHBART, a citizen of the United States of America, and a resident of Chicago, in the county of Cook, State of Illinois, have invented certain new and useful Improvements in Framing Means for Motion-Picture Machines, of which the following is a specification.

This invention relates to motion picture machines of the intermittent film feeding type, and has for its object:

To provide a simple and efficient structural formation and association of parts of the intermittent film feeding sprocket drum and accessories, adapted to attain a proper framing or positioning of the film picture in relation to the light aperture or passage of the machine. All as will hereinafter more fully appear.

In the accompanying drawings:—

Fig. 3 is an enlarged detail side elevation of the film feeding and guiding mechanism, and the associated driving mechanism of the film reels, with parts shown in section.

Fig. 4, is a detail longitudinal section on line 4—4, Fig. 1, of the associated light passage or aperture, film gate, intermittent film feeding sprocket drum and accessories.

Fig. 5, is a detail horizontal section on line 5—5, Fig. 3 of the film gate latching means.

Similar reference numerals indicate like parts in the several views.

Figure 1:
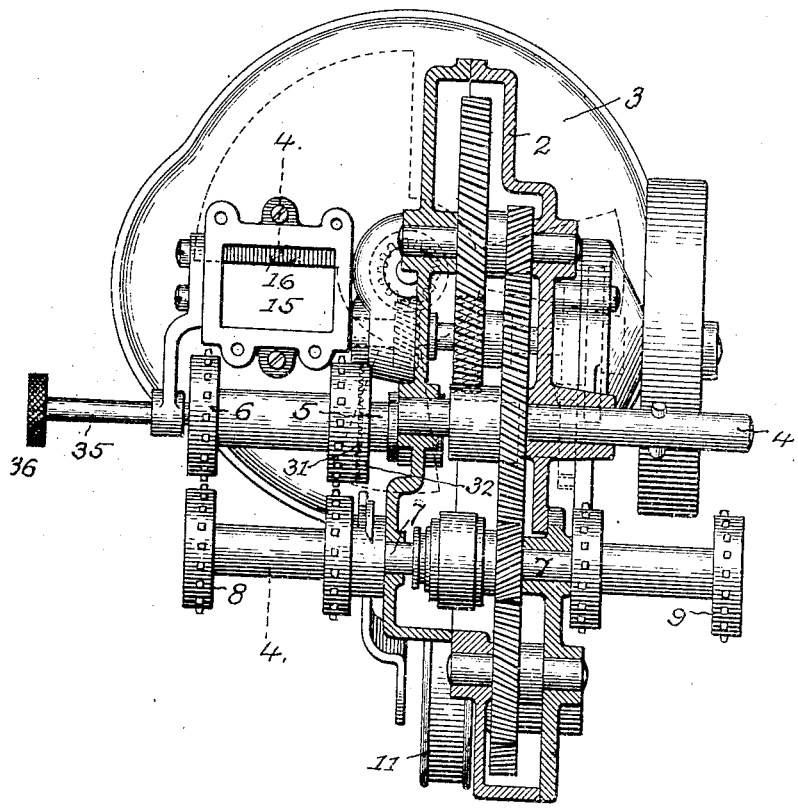
Figure 1, is a rear elevation of the film feeding and guiding mechanisms and accessories, with the supporting frame or casing therefor, shown in section.

Referring to the drawings, 1 designates a portion of an inclosing casing or box for the parts of a motion picture machine.

2 designates the supporting frame or casing for the film feeding and guiding mechanisms of the machine, secured to the front wall of the casing aforesaid, and having at its forward end a transverse expanded portion 3 adapted to contain the light shutter of the machine.

4 designates the main operating shaft of the machine, journaled in the frame 2 aforesaid, and adapted for engagement with the usual hand crank for manual actuation.

5 designates a shaft journaled transversely in the frame 2 aforesaid and having intermittent operative connection with the main shaft 4, by the usual train of gearing, and an intermittent gearing connection, such as the ordinary Geneva movement, as shown and described in detail in my companion application for Letters Patent, Serial No. 166,865, filed May 7, 1917.

6 designates the intermittent film feeding sprocket drum of machine and operatively carried by the shaft 5 aforesaid.

7 designates a clutch carrying shaft journaled in frame 2 aforesaid, and having operative connection with the main shaft 4 by the usual train of gearing, and capable of engagement with and disengagement from said gearing, by an automatic clutch connection described in detail in my aforesaid companion application. The shaft 7 extends approximately the width of the mechanism, and, at its respective ends carry sprocket drums 8 and 9, adapted to take up the film as it comes from the mechanism, and to feed the film in the form of a loop to such mechanism, as usual in the present type of motion picture machines.

10 designates a shaft journaled in the frame 2 aforesaid, and having gearing connection with the shaft 7 aforesaid.

11 designates a belt pulley carried by the shaft 10, and adapted for driving engagement with the endless driving belt of a film reeling mechanism, such as forms the subject matter of my companion application for Letters Patent Serial No. 166,866, filed May 7, 1917.

12 designates a swinging arm pivoted to the side of the frame 2 aforesaid, and carrying near its free end a pair of bearing rollers 13 individual to the take up sprocket drum 8 aforesaid, and normally adapted to maintain the picture film in peripheral engagement with said sprocket drum. The pair of bearing rollers 13 have a slight spaced relation, so that in rewinding a picture film back onto a normal film delivery reel, said film can be inserted between said rollers 13, after being unthreaded from the intermittent film feeding mechanism and accessories, so as to be guided by said rollers 13 into the oblique bend or loop which the film must necessarily assume in its passage from one film reel to another film reel in such rewinding operation.

14 designates a peripherally grooved roller journaled in an inclined direction on the side of the frame, 2, aforesaid, with its peripheral groove adapted to have guiding engagement with the edge of the picture film to maintain its oblique loop in proper position during the film rewinding operation above referred to.

15 designates a light passage or aperture formed in the frame 2 aforesaid, with its forward end adapted to receive the objective of the machine, while its inner end terminates in a vertical rear wall to which is secured the usual aperture plate 16 upon which the picture film has a sliding movement in passage through the optical axis of the machine.

17 designates the film confining gate, of the usual orificed plate form, associated with the aforesaid aperture plate 16. In the present improvement the film confining gate 17, is pivotally attached to the frame 2 aforesaid, by depending side extensions 18 at its lower end, and has a swinging movement in a vertical plane to and from the aforesaid vertical film guiding aperture plate 16, to admit of the ready insertion and removal of the picture film.

19 designates a guide roller journaled transversely of the film gate 17 and at the upper end thereof, and having close association with a companion guide roller 20 on the upper portion of the frame 2 aforesaid, to provide an upper guiding means for the picture film. In the present structure said guide rollers 19, 20 in connection with the sprocket drum 9, constitute the forming and maintaining means for the large and obliquely extending loop in the film, from which the supply of film to the intermittent film feeding mechanism, is taken with but little frictional impedance.

21 designate upper and lower bearing pads of textile or like elastic material, arranged transversely and adjacent to the respective upper and lower margins of the light aperture of the guide plate 16, and secured to the film gate 17 by screws or like fastening means.

22 designate vertical spring members secured at their midheight to the film gate 17, at opposite sides of the light aperture of the guide plate 16 and of the bearing pads 21 aforesaid, and having a flat loop form as shown, adapting them to exert an extended yielding stress upon the passing picture film and hold the same against the guide plate 16 without undue frictional retardance.

23 designate a plurality of bearing rollers journaled in the depending extensions 18 of the film gate, and adapted to hold the picture film in proper operative engagement with the intermittent film feeding sprocket drum 6 aforesaid.

24 designates a curved breast plate preferably formed as an extension of the guide plate 16 aforesaid, with its curved portion arranged between the sprocket carrying end disks of the intermittent sprocket drum 6 and in line with the perimeters of said disks. The breast plate 24 is adapted to support the central portion of the passing film and is formed with a reversely curved lower end 24' adapted to deflect the film away from the sprocket drum 6 and aid in the formation of the usual loop in the film intermediate of the sprocket drum 6 and the "take up" sprocket drum 8 aforesaid.

25 designate a pair of latch members having a transverse sliding movement on the upper part of the film gate 17 and provided with hook shaped flanges 26 on their outer ends for holding engagement with lugs on the casing 2 aforesaid. The inner ends of the latch members 25 lap past each other and are provided with out-turned prongs or finger pieces 27 for convenient manual operation, and so that when said prongs 27 are pressed toward each other by the fingers of the operator, the hook shape flanges 26 aforesaid, will move outwardly and be released from their holding engagement with the lugs of the frame 2, thus leaving the film gate 17 free for an opening or swinging movement to release the picture film.

28 designate a spring interposed between the finger pieces 27 aforesaid, and adapted to force the same apart, and in turn draw the latch members 25 together.

In the present improvement, the intermittent film feeding sprocket drum 6 is arranged immediately beneath the light passage 15 of the frame 2, with the rear part of its toothed periphery in line with the guide face of the vertical guide plate 16 aforesaid, and in connection with such arrangement the present improvement involves accessories as follows:

29 designates a curved plate or apron fixedly secured to the lower portion of the film gate 19 and preferably formed with a lower reversely curved end 30. The plate 29 is arranged between the bearing disks of the rollers 23 aforesaid, and is adapted in connection with the breast plate 24 heretofore described to provide a guide throat for the passing film.

With the above described structural formation and association of parts, the picture film can be fed backward by the intermittent film feeding mechanism in giving such form of a motion picture exhibition, in that the pushing backward of the film can be practically effected, due to the absence of any extended and unsupported portions in that part of the film within and adjacent to the zone of exhibition.

The intermittent film feeding sprocket drum 6 aforesaid, is in the present improvement mounted loosely on its carrying shaft 5, so as to be capable of a limited independent sliding and turning adjustment with relation to said shaft 5, and the sprocket drum 6 is normally locked to the shaft 5 by interengaging clutch teeth 31 on the adjacent ends of the drum 6 and a clutch collar 32 fixed on the shaft 5, as shown.

33 designates a spring arranged within an enlarged counterbore of the sprocket drum 6 and having bearing against an abutment collar 34 on the shaft 5, with a normal tendency to maintain the aforesaid clutch teeth 31 in an engaged condition.

35 designates an operating shaft secured in alined relation to the sprocket drum 6 aforesaid. The shaft 35 extends laterally and is provided at its outer end with a handle or knob 36 for manual operation.

With the above described construction, an outward pull or movement of the knob 36 and shaft 35 will effect a disengagement of the clutch teeth 31, against the yielding stress of the spring 33, and in such condition of the parts, the operator can effect an independent turning adjustment of the sprocket drum 6 in one direction or the other, to attain a proper framing of the picture film in relation to the light passage or aperture of the machine.

Figure 2:
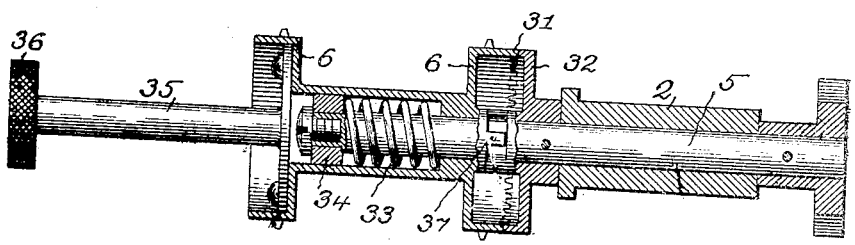
Fig. 2 is a detail transverse section on line 2—2, Fig. 4, of the rotary adjusting means of the intermittent film feeding sprocket drum.

With a view to prevent an excessive turning adjustment of the sprocket drum 6, and a consequent liability to tearing of the picture film, the extent of the independent adjustment above set forth is limited by the provision of an interengaging pin and circumferentially enlarged recess formation 37 on sleeve portions of the drum 6, and clutch collar 32 fixed on the carrying shaft 5 aforesaid, as shown more particularly in Fig. 2.

Having thus fully described my said invention, what I claim as new and desire to secure by Letters Patent, is:—

1. In a film feeding mechanism for motion picture machines, the combination of an operating shaft, a film feeding sprocket drum mounted for independent circular and longitudinal adjustments on said shaft, a clutch collar fixed on said shaft the adjacent faces of said drum and clutch collar having interengaging teeth, and an adjusting shaft secured in axial alinement to an end of the sprocket drum and having at its outer end an operating handle, substantially as set forth.

2. In a film feeding mechanism for motion picture machines, the combination of an operating shaft, a film feeding sprocket drum mounted for independent circular and longitudinal adjustments on said shaft, means for limiting the extent of the circular adjustment aforesaid, a clutch collar fixed on said shaft, the adjacent faces of said drum and clutch collar having interengaging teeth, and an adjusting shaft secured in axial alinement to an end of the sprocket drum and having at its outer end an operating handle, substantially as set forth.

3. In a film feeding mechanism for motion picture machines, the combination of an operating shaft a film feeding sprocket drum mounted for independent circular and longitudinal adjustments on said shaft, means for limiting the extent of the circular adjustment aforesaid, the same comprising an interengaged tooth and elongated recess on and in the respective parts, a clutch collar fixed on the operating shaft aforesaid, the adjacent faces of said drum and collar having interengaging teeth, and an adjusting shaft secured in axial alinement to an end of the sprocket drum and having at its outer end an operating handle, substantially as set forth.

4. In a film feeding mechanism for motion picture machines, the combination of an operating shaft having an abutment collar on its inner end, a film feeding sprocket drum mounted for independent circular and longitudinal adjustments on said shaft and formed with an enlarged counterbore adapted to receive the abutment collar aforesaid, a clutch collar fixed on said shaft, the adjacent faces of said drum and collar having interengaging teeth, a spring arranged in the counterbore of the sprocket drum intermediate of an end of the same and the abutment collar aforesaid, and an adjusting shaft secured in axial alinement to an end of the sprocket drum and having at its outer end an operating handle, substantially as set forth.

Signed at Chicago, Illinois, this 16th day of April, 1917.

BRUNO STECHBART.